May 13, 1958   R. O. GRISDALE ET AL   2,834,943
MECHANICALLY COUPLED ELECTROMECHANICAL AND
MAGNETOMECHANICAL TRANSDUCERS
Filed Sept. 16, 1953   2 Sheets-Sheet 1
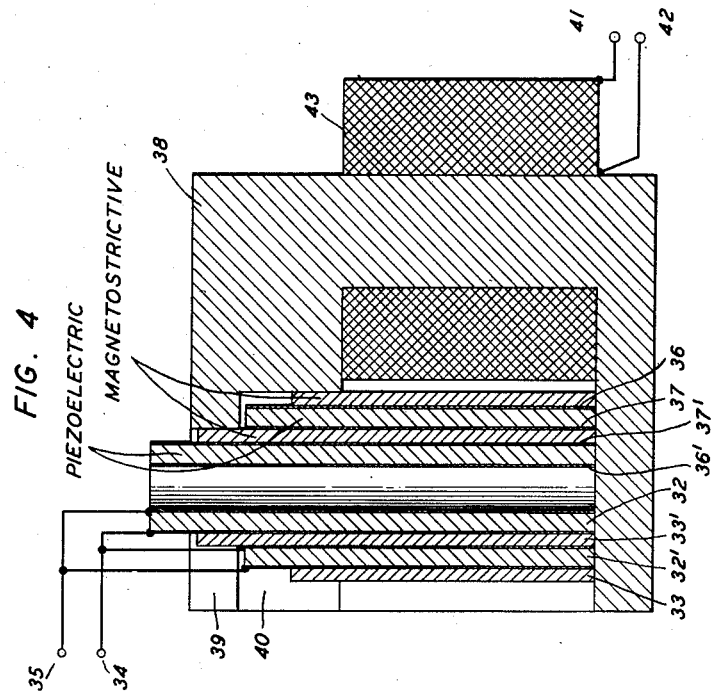
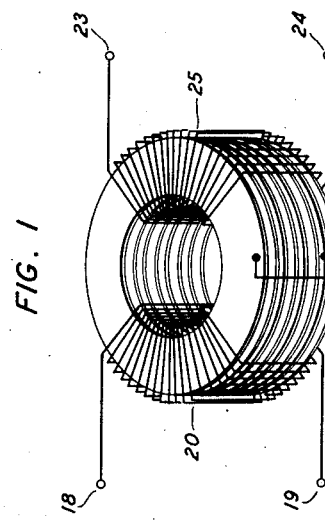
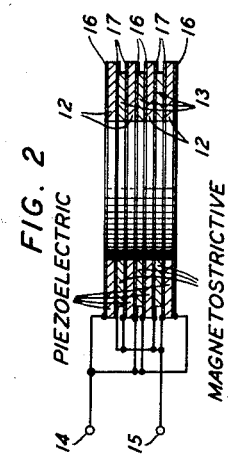
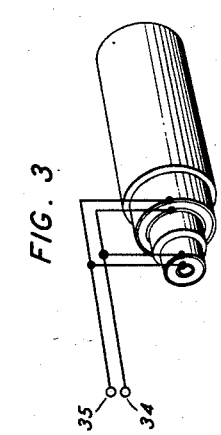
INVENTORS
R. O. GRISDALE
J. H. ROWEN
BY
Hugh S. Wertz
ATTORNEY INVENTORS
R. O. GRISDALE
J. H. ROWEN
BY Hugh S. Wertz
ATTORNEY

United States Patent Office 2,834,943
Patented May 13, 1958

2,834,943

MECHANICALLY COUPLED ELECTROMECHANICAL AND MAGNETOMECHANICAL TRANSDUCERS

Richard O. Grisdale, Short Hills, and John H. Rowen, Morristown, N. J., assignors to Bell Telephone Laboratories, Incorporated, New York, N. Y., a corporation of New York Application September 16, 1953, Serial No. 380,574

9 Claims. (Cl. 332—51)

This invention relates to impedance transforming, variable inductance, and modulation devices, and, more specifically, to such devices in which piezoelectric and magnetostrictive materials are mechanically coupled together. Elements formed of piezoelectric material exhibit the property of expanding or contracting when subjected to an electric field, and, conversely, develop an electric field when they are stressed. Magnetostrictive elements exhibit similar properties with respect to magnetic rather than electric fields.

It has previously been proposed by E. M. McMillan in the Journal of the Acoustical Society of America, volume 18, No. 2, pages 344 through 347, October 1946, to construct a gyrator by mechanically coupling electromechanical and magnetomechanical transducers. Considering the meaning of these terms, an electromechanical transducer is a voltage response device, such as a phonograph crystal pick-up, which exhibits a mechanical displacement while a magnetomechanical transducer is a current responsive device which yields a mechanical movement in response to the developed magnetic field. A gyrator is a transducer in which the phase shift of signals transmitted therethrough differs by approximately 180 degrees for the two directions of transmission. Although McMillan indicated that it was theoretically possible to construct a gyrator by mechanically coupling two elements of the type noted above, the actual construction of a practical device of this type is not a simple matter. In particular, the very low coupling coefficients through the combination of a conventional electromechanical transducer and a conventional magnetomechanical transducer intercoupled by a mechanical link, make such devices impractical.

Accordingly, one object is to reduce the losses of electrical gyrators or non-reciprocal transducers.

As set forth in application Serial No. 312,746 of M. Goertz and H. J. Williams, filed October 2, 1952, and assigned to the assignee of the present application, now Patent 2,818,514, granted December 31, 1957, it is known that the magnetic properties of ferrites will change when they are stressed, as compared to their properties in the unstressed state. However, considerable difficulty has been encountered in finding a simple method of continuously and rapidly varying the stress on the ferrite element so that it could be used as a modulation or a variable inductance element.

Another object is, therefore, the improvement of variable inductance, and modulation components.

In accordance with the invention, piezoelectric and magnetostrictive elements are mechanically coupled together and are closely coupled to their respective electric and magnetic control elements. One specific embodiment of the invention is a stack of thin annular magnetostrictive and piezoelectric plates interleaved with and integrally bonded to one another. The input and output connections of this device are through one or more toroidal coils wound through the central aperture of the annular unit to couple to the magnetostrictive plates, and electrodes on either side of the piezoelectric plates.

A feature of the invention lies in the isolation and stabilization of a carrier frequency source, made possible by the combined modulation and gyrator properties of the present device.

Other objects, features, and advantages of the invention will be developed in the course of the detailed description of drawings. In the drawings:

Fig. 1 is an isometric view of a magnetostrictive-piezoelectric transducer in accordance with the invention;

Fig. 2 is a cross sectional view of the device of Fig. 1;

Fig. 3 represents the active portion of another form of the transducer in which the ferrite and titanate elements are concentric cylinders;

Fig. 4 is an enlarged cross sectional view of Fig. 3, and also includes the external magnetic return path;

Figure 5:
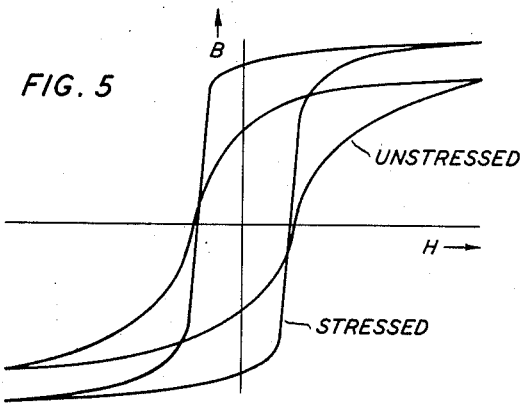
Fig. 5 is a plot showing hysteresis loops for a ferrite ring with and without compressive force applied.

Referring to the drawings, Figs. 1 and 2 show a transducer made of a stack of interleaved magnetostrictive and piezoelectric plates integrally bonded together. The annular core is made up of the piezoelectric plates 12 interleaved with the magnetostrictive plates 13. On either side of each of the piezoelectric plates are electrodes 16 and 17, which are brought out to the external electrode terminals 14 and 15 so that potentials may be readily applied across each piezoelectric plate. Coupling to the ferrite rings 13 is obtained from terminal paths 18, 19, and 23, 24 which are connected to coils 20 and 25, respectively. For clarity, the details of the coupling to the magnetic and to the electrostatic plates are shown in Figs. 1 and 2 respectively, but it is to be understood that the structure includes both the coupling coils illustrated in Fig. 1 and the interconnected electrodes detailed in Fig. 2.

The piezoelectric plates may be made from any of a number of substances which change their linear dimension when an electric field is applied across them. As used in this application, the term "piezoelectric" is to be construed as applying to materials which are sometimes termed "electrostrictive" as well as to conventional piezoelectric substances. One material which has proved eminently satisfactory for this purpose is barium titanate ($BaTiO_3$). The magnetostrictive material may increase or decrease in its linear dimensions when a circumferential magnetic field is applied depending on the sign of the magnetostriction of the material. The magnetostrictive material is preferably a ferrite, and a polycrystalline ferrite of the formula $Ni_{.7}Zn_{.3}Fe_2O_3$ has proved satisfactory.

In the operation of this device, a signal may be applied either to one of the coils or to the electrode terminals. When the signal is applied to one of the coils, the diameter of each ferrite element increases slightly, the piezoelectric elements which are bonded to the ferrite elements are correspondingly stressed, and this induces an electric signal at the output terminals 14, 15. Similarly, a signal applied at terminals 14, 15 will induce a signal at the coil terminals 18, 19 and 23, 24.

In the manufacture of these units, thick cylinders of ferrite and of barium titanate having axial apertures, are cut transversely in a grinding operation and the thin annular plates resulting from the subdivision of the cylinders are interleaved with one another preparatory to bonding. Although various techniques for bonding have been employed, soldering and glass bonding are preferred.

In the device of Figs. 3 and 4, cylinders of magnetostrictive and piezoelectric material are used instead of the annular plates shown in Figs. 1 and 2. In this embodiment, the cylinders 32 and 32' of titanate are bonded to the cylinders 33 and 33' of ferrite. The terminals 34 and 35 are coupled to the electrodes 36 and 37 on either side of the cylinders, and the coil 43 provides coupling to the ferrite elements. Linking the coil 43 with the ferrite cylinders is the external magnetic yoke 38 which is notched at 39, 40 to receive the upper end of the magnetostrictive-piezoelectric unit. As in the case of the device of Figs. 1 and 2, an electric signal applied at terminals 41, 42 and coupled to the ferrite core elements by means of coil 43 and the magnetic yoke 48 will change the size of the active unit 32, 33 and generate an electric signal at electrodes 36, 37 which may be picked up at electrical terminals 34 and 35.

In the devices of Figs. 3 and 4 where a magnetic yoke is employed, means must be provided to permit a slight expansion or contraction of the piezoelectric-magnetostrictive unit without opening the closed magnetic circuit. This may be either through the notched structure shown or by the use of a sufficiently resilient magnetic yoke member.

With a view toward analyzing the devices of Figs. 1 and 3 as four terminal networks, certain general considerations in regard to four terminal networks and reciprocity will be set forth. A four-terminal electrical network is said to satisfy the "reciprocity theorem" if "an electromotive force E applied between two terminals produces a current I at two other terminals, and the same voltage E acting at the second point in the circuit will produce the same current I at the first point." As set forth in the above noted article by E. M. McMillan, a four-terminal linear passive system satisfies the reciprocity theorem if the transfer impedances in each direction are equal. Thus, where the current-voltage relationships on each side of a network are given by the expressions:

$$E_1 = Z_{11}I_1 + Z_{12}I_2 \text{ and}$$
$$E_2 = Z_{21}I_1 + Z_{22}I_2$$

where $E_1$ and $I_1$ are the voltage and current at the input terminals, where $E_2$ and $I_2$ are the voltage and current at the output terminals, and where $Z_{11}$ and $Z_{22}$ are the input and output self impedances and $Z_{21}$ and $Z_{12}$ are the forward and reverse transfer impedances, when the transfer impedances $Z_{12}$ and $Z_{21}$ are equal, the network is said to be reciprocal. Most passive circuit networks do satisfy the reciprocity theorem, and are reciprocal. Certain specific four-terminal devices, however, such as Hall effect plates and mechanically coupled electromechanical and magnetomechanical transducers have transfer impedances which are equal in magnitude but differ in phase shift by 180 degrees. Such transducers, in which $Z_{21} = -Z^{12}$, are useful in circuit synthesis and as componets in "one-way" transmission systems.

It may be noted that practical embodiments of these transducers, which are often termed "gyrators" tend to have quite high losses, and often do not have transfer impedances which are exactly equal or which differ in phase shift by exactly 180 degrees for the two directions of transmissions.

E. M. McMillan discloses a circuit for one-way transmission using a gyrator in his article cited above, and another one-way circuit is disclosed in the patent application of W. P. Mason and W. Shockley, Serial No. 302,278, filed August 1, 1952, which issued as Patent 2,775,658 on December 25, 1956.

Viewing the transducers of Figs. 1 and 3 from one pair of coil terminals and from their electrode terminals, they may be seen to be mechanically coupled electromechanical and magnetomechanical transducers of the general type analyzed by McMillan. In the present case, however, the mechanical coupling has been greatly increased by the use of magnetostrictive and piezoelectric elements which are bonded together over large surface areas.

Figure 6:
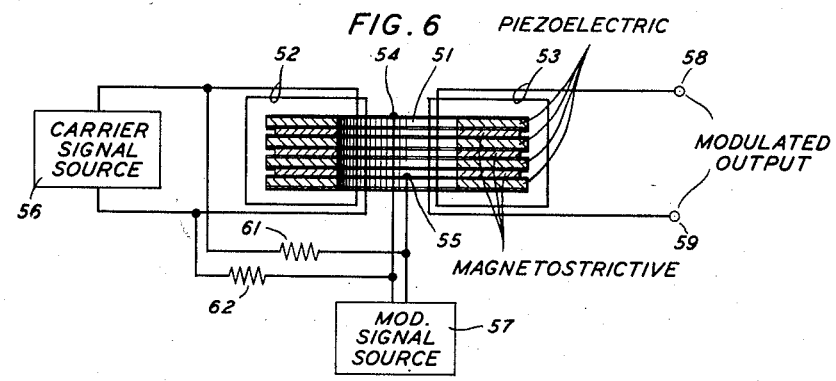
Figs. 6 and 7 illustrate circuits in which the transducers of Figs. 1 to 4 are used as modulation elements.
Figure 7:
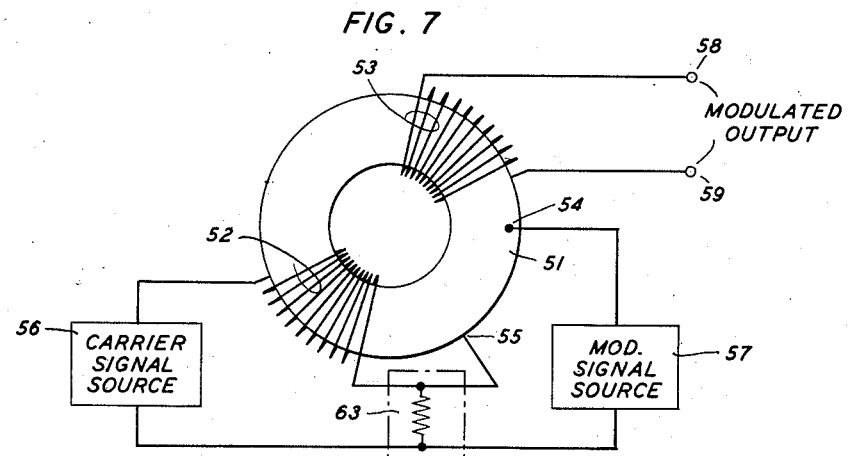

As disclosed in the above-identified patent application of M. Goertz and H. J. Williams, cores made from magnetostrictive ferrites tend to have substantial changes in their magnetic properties as the stress applied to them is varied. In Fig. 5, hysteresis loops for an annular ferrite sample having a composition of $Ni_{.3}Zn_{.7}Fe_2O_3$ with and without compression are shown. Referring to Figs. 6 and 7, a stack of magnetostrictive ferrite and piezoelectric plates 51 of the type shown in Figs. 1 and 2 has two coils 52 and 53 coupled to it, and has electrodes 54, 55 coupled to the piezoelectric plates which are interleaved with the ferrite plates. When the voltage applied to the electrodes 54, 55 is varied, the piezoelectric plates expand or contract depending on the applied polarity, and apply tension or compression to the ferrite cores. This, of course, substantially changes the coupling between coils 52 and 53 in accordance with the plot of Fig. 5. In the circuits of Figs. 6 and 7 these characteristics are employed to obtain modulation, by applying signals from the carrier signal generator 56 to the coil 52 and energizing the electrodes from the modulation signal generator 57. The modulated output is picked up at terminals 58, 59 of coil 53.

A slight refinement of the modulation circuit noted above is made possible by the gyrator properties of the present device which it possesses in addition to its modulator properties. More specifically, by the addition of a reciprocal circuit network such as in shown at 61, 62 of Fig. 6 or at 63 in Fig. 7, the carrier signal generator can be effectively isolated from the modulation source. The physical reason for this lies in the fact that the transfer impedance from the modulation source 57 through the gyrator unit 51 to the carrier generator 56 has a phase displacement of approximately 180 degrees while the impedance through the reciprocal networks has zero phase shift, and signals in the two paths can therefore be made to annul one another. For a more rigorous analysis of these networks, reference is again made to the McMillan article and the patent application of W. P. Mason and W. Shockley cited above. With the carrier signal generator isolated from the modulator, undesirable reaction from modulator to carrier generator is prevented and frequency stability is assured.

It is to be understood that the above-described arrangements are illustrative of the application of the principles of the invention. Numerous other arrangements may be devised by those skilled in the art without departing from the spirit and scope of the invention.

What is claimed is:

1. In combination, a plurality of substantially cylindrical elements of magnetostrictive material, a plurality of cylindrical elements of piezoelectric material having electrodes secured to two opposite sides thereof, means for bonding said cylinders together, said cylinders of magnetostrictive material being bonded to and interleaved with said cylinders of piezoelectric material, and electrical means for inductively coupling to said magnetostrictive cylinders.

2. In combination, a closed magnetic loop including a plurality of elements of magnetostrictive ferrite, a plurality of elements of barium titanate interspersed with and bonded to said ferrite elements over the greater portion of the surface area of said elements, means for magnetically coupling to said ferrite, and means for electrostatically coupling to said titanate elements.

3. A one-way transmission circuit comprising a plurality of elements of magnetostrictive material, a plurality of elements of piezoelectric material interspersed with and integrally secured to said elements of magnetostrictive material, induction means for coupling with said magnetostrictive elements, electrostatic means for coupling with said piezoelectric elements, first and second circuits connected to said induction and said electrostatic means, respectively, the transfer impedances in opposite directions between said first and second circuits through the magnetostrictive-piezoelectric transducer being substantially equal in magnitude but differing in phase by substantially 180 degrees, and a reciprocal network interconnecting said first and second circuits in shunting the magnetostrictive-piezoelectric transducer, the impedance of said reciprocal network being of the same order of magnitude as the transfer impedance of said magnetostrictive-piezoelectric transducer.

4. A one-way transmission circuit comprising a closed magnetic circuit including a plurality of plates of magnetostrictive material, a plurality of plates of piezoelectric material interleaved with and integrally secured to said elements of magnetostrictive material, induction means for coupling with said magnetostrictive plates, electrostatic means for coupling with said piezoelectric plates, first and second circuits connected to said induction and said electrostatic means, respectively, the transfer impedances in opposite directions between said first and second circuits through the magnetostrictive-piezoelectric transducer being substantially equal in magnitude but differing in phase by substantially 180 degrees, and a reciprocal network interconnecting said first and second circuits and shunting the magnetostrictive-piezoelectric transducer, the impedance of said reciprocal network being of the same order of magnitude as the transfer impedance of said magnetostrictive-piezoelectric transducer.

5. In combination, a stack of annular piezoelectric and magnetostrictive plates interleaved with and integrally bonded to each other, first and second coils threaded through the openings in the plates of said stack, a source of alternating current signals coupled to one of said coils, circuit means electrostatically coupled to said piezoelectric plates, and reciprocal circuit means for applying signals from said source of signals directly to said last-mentioned circuit means.

6. In combination, a plurality of thin piezoelectric and magnetostrictive cylinders interleaved with and integrally bonded to each other, first and second coils wound on said cylinders, a first circuit coupled to one of said coils, a second circuit electrostatically coupled to said piezoelectric cylinders, a source of alternating current signals coupled to one of said circuits, and reciprocal circuit means for applying signals from said source to the other of said circuits.

7. In combination, a magnetostrictive-piezoelectric transducer comprising a plurality of thin piezoelectric and magnetostrictive cylinders interleaved with and integrally bonded to each other, first and second coils wound on said cylinders, a first input circuit coupled to one of said coils, a second input circuit electrostatically coupled to said piezoelectric cylinders, a source of alternating current signals coupled to one of said input circuits, and reciprocal circuit means for applying signals from said source to the other of said input circuits, the impedance of said reciprocal circuit means being of the same order of magnitude as the transfer impedance of said magnetostrictive-piezoelectric transducer between said two input circuits.

8. In combination, a magnetostrictive-piezoelectric transducer comprising an element of magnetostrictive material and an element of piezoelectric material integrally bonded to said magnetostrictive element, first and second coils electrically coupled to said magnetostrictive element, a source of alternating current signals coupled to one of said coils, a second source of alternating current signals of a different frequency electrostatically coupled to said piezoelectric element, and reciprocal circuit means intercoupling the outputs of said two signal sources, the impedance of said reciprocal circuit means being of the same order of magnitude as the transfer impedance of the magnetostrictive-piezoelectric transducer.

9. In combination, a stack of annular barium titanate plates and magnetostrictive ferrite plates interleaved with and integrally bonded to each other, the radial width of each of said plates being several times greater than their thickness, a coil threaded through the openings in said plates, and means for electostatically coupling to said barium titanate plates.

References Cited in the file of this patent

UNITED STATES PATENTS

| | | |
|---|---|---|
| 1,907,425 | Marrison | May 9, 1933 |
| 2,551,848 | Parker | May 8, 1951 |
| 2,571,019 | Donley | Oct. 9, 1951 |
| 2,636,135 | Peek | Apr. 21, 1953 |
| 2,683,856 | Kornei | July 13, 1954 |